United States Patent
Chin et al.

(10) Patent No.: US 10,228,527 B2
(45) Date of Patent: Mar. 12, 2019

(54) GIMBAL TRANSMISSION CABLE MANAGEMENT

(71) Applicant: Raytheon Company, Waltham, MA (US)

(72) Inventors: Patricia D. Chin, Redondo Beach, CA (US); John D. Isker, Sun City, CA (US)

(73) Assignee: Raytheon Company, Waltham, MA (US)

(*) Notice: Subject to any disclaimer, the term of this patent is extended or adjusted under 35 U.S.C. 154(b) by 514 days.

(21) Appl. No.: 14/866,530

(22) Filed: Sep. 25, 2015

(65) Prior Publication Data

US 2017/0090141 A1    Mar. 30, 2017

(51) Int. Cl.

| | | |
|---|---|---|
| *G03B 17/00* | (2006.01) | |
| *G02B 6/44* | (2006.01) | |
| *F16L 3/16* | (2006.01) | |
| *F16M 13/02* | (2006.01) | |
| *H02G 3/04* | (2006.01) | |
| *G01S 7/00* | (2006.01) | |
| *G01S 7/481* | (2006.01) | |
| *F41G 7/22* | (2006.01) | |

(52) U.S. Cl.
CPC ............ *G02B 6/4478* (2013.01); *F16L 3/16* (2013.01); *F16M 13/022* (2013.01); *G01S 7/003* (2013.01); *G01S 7/4818* (2013.01); *G02B 6/4457* (2013.01); *H02G 3/04* (2013.01); *F41G 7/2213* (2013.01)

(58) Field of Classification Search
CPC ...................................................... H02G 3/04
USPC ....... 248/184.1, 183.1, 183.2, 49; 396/7, 12, 396/13, 419, 427, 428
See application file for complete search history.

(56) References Cited

U.S. PATENT DOCUMENTS

| | | | | |
|---|---|---|---|---|
| 2,415,563 | A * | 2/1947 | Nash ....................... | G03B 15/00 318/674 |
| 2,506,095 | A * | 5/1950 | Mantz ................... | G03B 17/561 188/306 |
| 2,523,267 | A * | 9/1950 | Aschenbrenner ...... | G02B 27/64 250/204 |
| 3,085,354 | A * | 4/1963 | Rasmussen ............. | G09B 9/12 434/31 |
| 3,638,502 | A * | 2/1972 | Leavitt ................... | G01C 21/18 348/147 |
| 4,829,162 | A * | 5/1989 | Soloski .................... | H05B 3/00 219/200 |
| 5,005,930 | A | 4/1991 | Schotter | |

(Continued)

*Primary Examiner* — Terrell L McKinnon
*Assistant Examiner* — Michael D McDuffie

(57) ABSTRACT

A gimbal transmission cable management system is disclosed. The system can include a first gimbal portion and a second gimbal portion rotatable relative to one another to provide rotation about a gimbal axis. The system can also include a cable retainer fixed relative to one of the first and second gimbal portions and defining a cable volume between the cable retainer and at least one of the first and second gimbal portions. In addition, the system can include a transmission cable coiled about the gimbal axis within the cable volume. Bi-directional relative rotation of the first and second gimbal portions can alternately coil and uncoil a portion of the transmission cable about the gimbal axis within the cable volume.

20 Claims, 4 Drawing Sheets

(56) References Cited

U.S. PATENT DOCUMENTS

| | | | |
|---|---|---|---|
| 5,153,623 A * | 10/1992 | Bouvier | G08B 13/19632 348/151 |
| 5,617,762 A * | 4/1997 | Kirsch | B25J 17/0283 248/183.2 |
| 5,619,215 A | 4/1997 | Sydor | |
| 6,147,701 A | 11/2000 | Tamura et al. | |
| 6,262,687 B1 | 7/2001 | Bai et al. | |
| 6,477,918 B2 | 11/2002 | Sakamoto | |
| 6,628,338 B1 * | 9/2003 | Elberbaum | G08B 13/1963 348/373 |
| 6,793,414 B2 | 9/2004 | Akada | |
| 6,912,341 B2 | 6/2005 | Tietjen | |
| 7,274,805 B2 | 9/2007 | Horie et al. | |
| 7,304,296 B2 | 12/2007 | Mills et al. | |
| 7,667,190 B2 | 2/2010 | Mills et al. | |
| 7,905,463 B2 * | 3/2011 | Burnham | F16M 11/123 248/177.1 |
| 8,000,588 B1 * | 8/2011 | Harvey | G03B 17/00 348/144 |
| 8,180,187 B2 | 5/2012 | Bunch et al. | |
| 8,523,462 B2 | 9/2013 | Dimotakis | |
| 8,648,963 B2 * | 2/2014 | Oh | F16M 11/126 348/151 |
| 8,705,929 B2 | 4/2014 | Kowalczyk et al. | |
| 8,757,559 B2 | 6/2014 | Davis et al. | |
| 9,749,544 B2 | 8/2017 | Wang | |
| 2001/0055487 A1 * | 12/2001 | Akada | H04N 5/232 396/427 |
| 2002/0051640 A1 * | 5/2002 | Arbuckle | G03B 17/02 396/427 |
| 2007/0041726 A1 * | 2/2007 | Lee | G03B 17/02 396/427 |
| 2007/0075182 A1 | 4/2007 | Fetterly | |
| 2007/0075237 A1 | 4/2007 | Mills et al. | |
| 2007/0206177 A1 | 9/2007 | Anschel et al. | |
| 2008/0124069 A1 * | 5/2008 | Basho | G03B 27/58 396/427 |
| 2008/0267611 A1 * | 10/2008 | Huang | G03B 17/00 396/427 |
| 2010/0260495 A1 | 10/2010 | Usami et al. | |
| 2012/0082441 A1 * | 4/2012 | Krueger | G01C 11/02 396/7 |
| 2013/0064518 A1 | 3/2013 | Kolvek et al. | |
| 2013/0105619 A1 * | 5/2013 | Buscher | B64D 47/08 244/17.11 |
| 2014/0009328 A1 | 1/2014 | Knight et al. | |
| 2017/0336019 A1 | 11/2017 | Liu et al. | |

* cited by examiner

GIMBAL TRANSMISSION CABLE MANAGEMENT

GOVERNMENT LICENSE RIGHTS

This invention was made with government support under Contract No. H94003-04-D-0006-0228 awarded by the Department of Defense. The government has certain rights in the invention.

BACKGROUND

Modern sensors and other electronic devices are often mounted within gimbal mechanisms to achieve free movement in multiple axes, which is especially true for many military applications. Transmission cables, such as electrical cable wraps, have been in use for years to carry signals and/or electrical power within a gimbal. Optical instruments, such as ladar heads or telescopes, are becoming increasingly common in gimbal mounted systems. Often, an off-gimbal light source, such as a laser, is used to transmit light via a fiber optic transmission cable to an on-gimbal optical instrument, which may require the fiber optic cable to traverse one or more rotational axes of the gimbal. Fiber optic cables require minimum bend radii to operate within required performance specifications. The minimum bend radius of a fiber optic cable depends upon a variety of factors, including the signal handled by the fiber optic cable, the style of the fiber optic cable, and equipment to which the fiber optic cable is connected.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
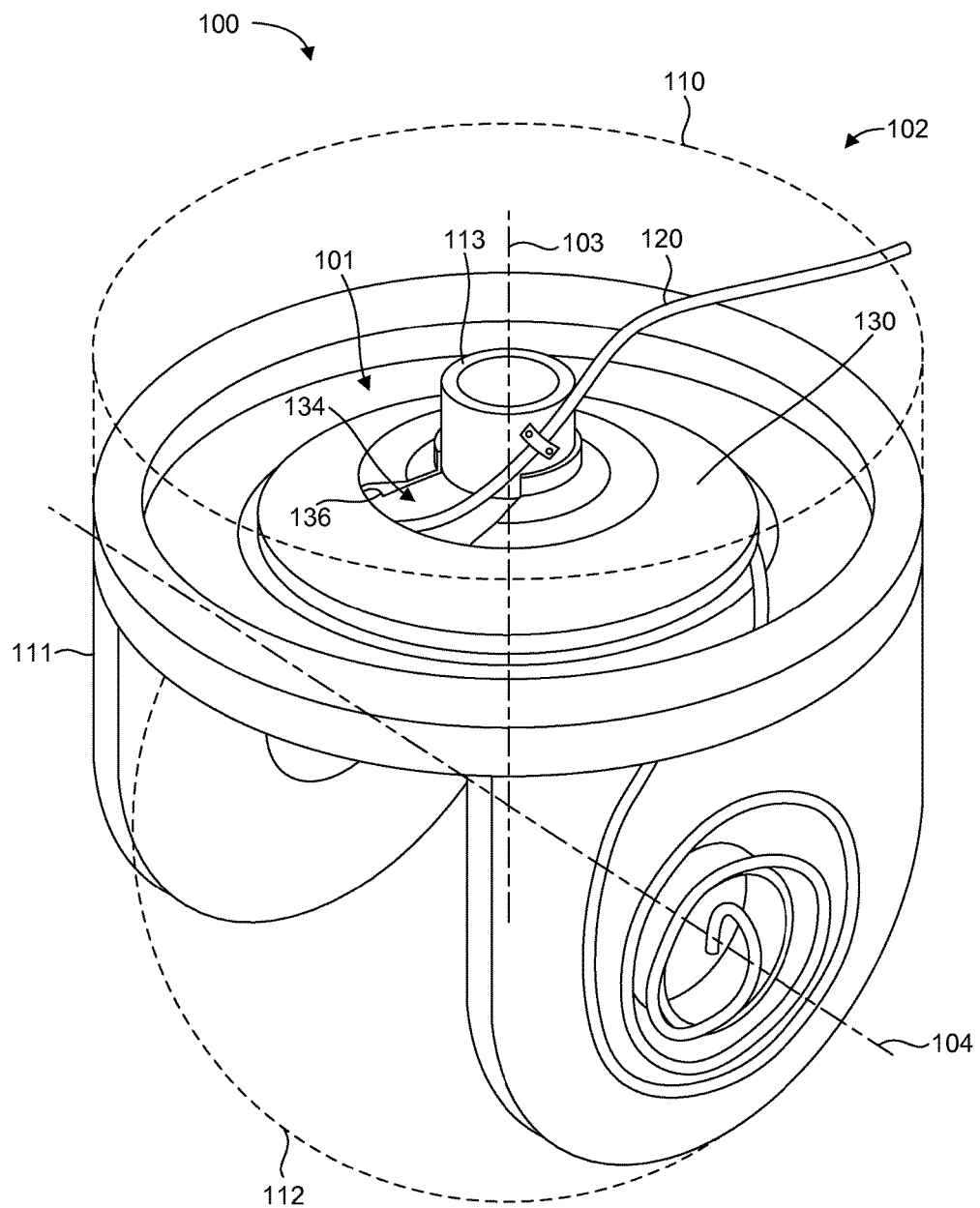
FIG. 1 is perspective view of a gimbal transmission cable management system in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Transmission cables, particularly fiber optic cables, are vulnerable to damage when routed through gimbal mechanisms. During use of a gimbal, such cables are susceptible to bending in excess of the minimum bend radius (e.g., kinking) and can bind or jam the gimbal mechanism. In addition, electrical cables and fiber optic cables may be required to co-exist within a confined space of the gimbal. In such cases, optical and electrical cables can become tangled, causing damage to the cables. It is therefore desirable to arrange transmission cables in a manner that allows repeated motion of the gimbal without cable damage or binding of the gimbal mechanism.

Accordingly, a transmission cable management device for a gimbal is disclosed that facilitates repeatability and reliability of transmission cable movement during use of the gimbal mechanism. In one aspect, multiple transmission cables, such as fiber optic and electrical cables, can be packaged into a confined space and can move repeatedly and independently of one another. The transmission cable management device can include a cable retainer to be fixed relative to one of a first gimbal portion and a second gimbal portion. The first and second gimbal portions can be rotatable relative to one another about a gimbal axis. The cable retainer can be configured to define a cable volume between the cable retainer and at least one of the first and second gimbal portions. The cable volume can be configured to receive a transmission cable therein coiled about the gimbal axis. Bi-directional relative rotation of the first and second gimbal portions can alternately coil and uncoil a portion of the transmission cable about the gimbal axis within the cable volume.

In one aspect, a gimbal transmission cable management system is disclosed. The system can include a first gimbal portion and a second gimbal portion rotatable relative to one another to provide rotation about a gimbal axis. The system can also include a cable retainer fixed relative to one of the first and second gimbal portions and defining a cable volume between the cable retainer and at least one of the first and second gimbal portions. In addition, the system can include a transmission cable coiled about the gimbal axis within the cable volume. Bi-directional relative rotation of the first and second gimbal portions can alternately coil and uncoil a portion of the transmission cable about the gimbal axis within the cable volume.

One example of a gimbal transmission cable management system 100 is illustrated in FIG. 1. The system 100 can comprise a transmission cable management device 101 for a gimbal 102. Certain structures and components of the gimbal 102 have been omitted or illustrated in broken lines for clarity in illustrating various aspects of the system 100. The gimbal 102 can include several gimbal portions 110, 111, 112 that are rotatable relative to one another. For example, the gimbal portion 110 and the gimbal portion 111 are rotatable relative to one another to provide rotation about a gimbal axis 103, which may be an azimuth axis in some embodiments. In addition, the gimbal portion 111 and the gimbal portion 112 are rotatable relative to one another to provide rotation about a gimbal axis 104, which may be an elevation axis in some embodiments. It should be recognized that a gimbal can have any suitable number of rotational gimbal portions and gimbal axes, such as to provide rotation about three gimbal axes.

The system 100 can also include a transmission cable 120, such as an optical cable, an electrical cable, etc., which can be used for signal transmission (e.g., RF or electric current), power transmission, etc. for devices (not shown, but known to those skilled in the art) contained within or mounted on the gimbal 102. The transmission cable 120 can be of any suitable configuration, such as a single fiber optic line or a bundle of fiber optic lines, a ribbon cable, etc. In one aspect, the transmission cable 120 can comprise a continuous or unitary optical fiber line that optically couples an off-gimbal optical source, such as a laser, to an on-gimbal optical element, such as a ladar unit or a telescope. Thus, the system 100 can provide for an uninterrupted optical path between an off-gimbal source and an on-gimbal element or component.

Figure 2:
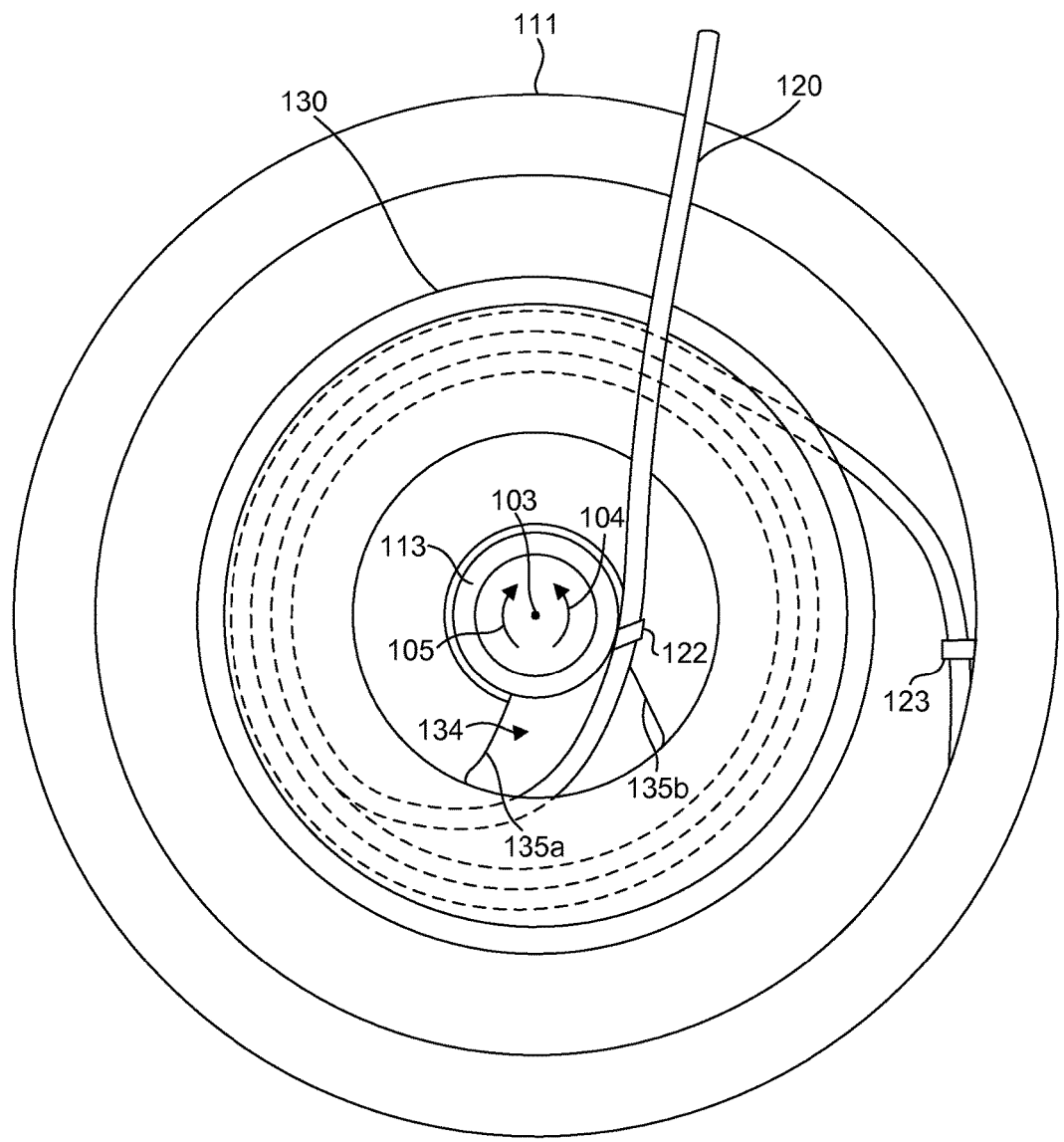
FIG. 2 is a top view of the gimbal transmission cable management system of FIG. 1.

The cable management device 101 of the system 100 can include a cable retainer 130 fixed relative to one of the gimbal portions. For example, in FIG. 1 a resolver cup 113 can be fixedly coupled to or integral with the gimbal portion 110, and the cable retainer 130 can be fixedly coupled to the resolver cup 113 such that there is no relative movement between the two components. As shown in the top view of FIG. 2, which illustrates the gimbal portion 111, the resolver cup 113, the transmission cable 120, and the cable retainer 130 of the system 100, the transmission cable 120 is coiled about the gimbal axis 103. Further, the cross-sectional view of FIG. 3, which illustrates the same system 100 components as FIG. 2, shows the transmission cable 120 coiled about the gimbal axis 103 within a cable volume 131 defined by the cable retainer 130, between the cable retainer 130 and the gimbal portion 111. Bi-directional relative rotation in directions 104, 105 of the gimbal portion 110 (e.g., the resolver cup 113) and the gimbal portion 111 alternately coils and uncoils a portion of the transmission cable 120 about the gimbal axis 103 within the cable volume 131. In other words, a portion of the transmission cable 120 is wound tighter or unwound looser about the gimbal axis 103 within the cable volume 131. The cable retainer 130 can therefore maintain the transmission cable 120 in a separate encapsulated volume from other components of the gimbal 102. The cable volume 131 can be configured to allow the transmission cable 120 to freely coil and uncoil in a predictable and repeatable manner as the gimbal portion 110 and the gimbal portion 111 rotate relative to one another.

Because the transmission cable 120 can slide relative to the gimbal portion 111 and/or the cable retainer 130 as the cable 120 coils and uncoils, the gimbal portion 111 and/or the cable retainer 130 can be configured to facilitate movement of the transmission cable 120 within the cable volume 131 as the transmission cable 120 coils and uncoils, such as between a looser and a tighter wrap or coil about the gimbal axis 103. In one aspect, the gimbal portion 111 and/or the cable retainer 130 can have a smooth surface finish and/or be at least partially constructed of friction reducing material, such as Teflon® or other materials, to facilitate movement of the transmission cable 120 within the cable volume 131. For example, the gimbal portion 111 and/or the cable retainer 130 can have a smooth surface finish and/or be coated with friction reducing material on areas or surfaces that may contact the transmission cable 120 to facilitate sliding of the transmission cable 120. Similarly, an outer surface of the transmission cable 120 can be smooth or coated with a friction reducing material to allow the cable 120 to slide smoothly over surfaces of the gimbal 102 and the cable retainer 130 to coil and uncoil with minimal friction. In one aspect, several fiber optic lines or cables can be bundled together inside a smooth, low friction, coated "jacket."

Figure 3:
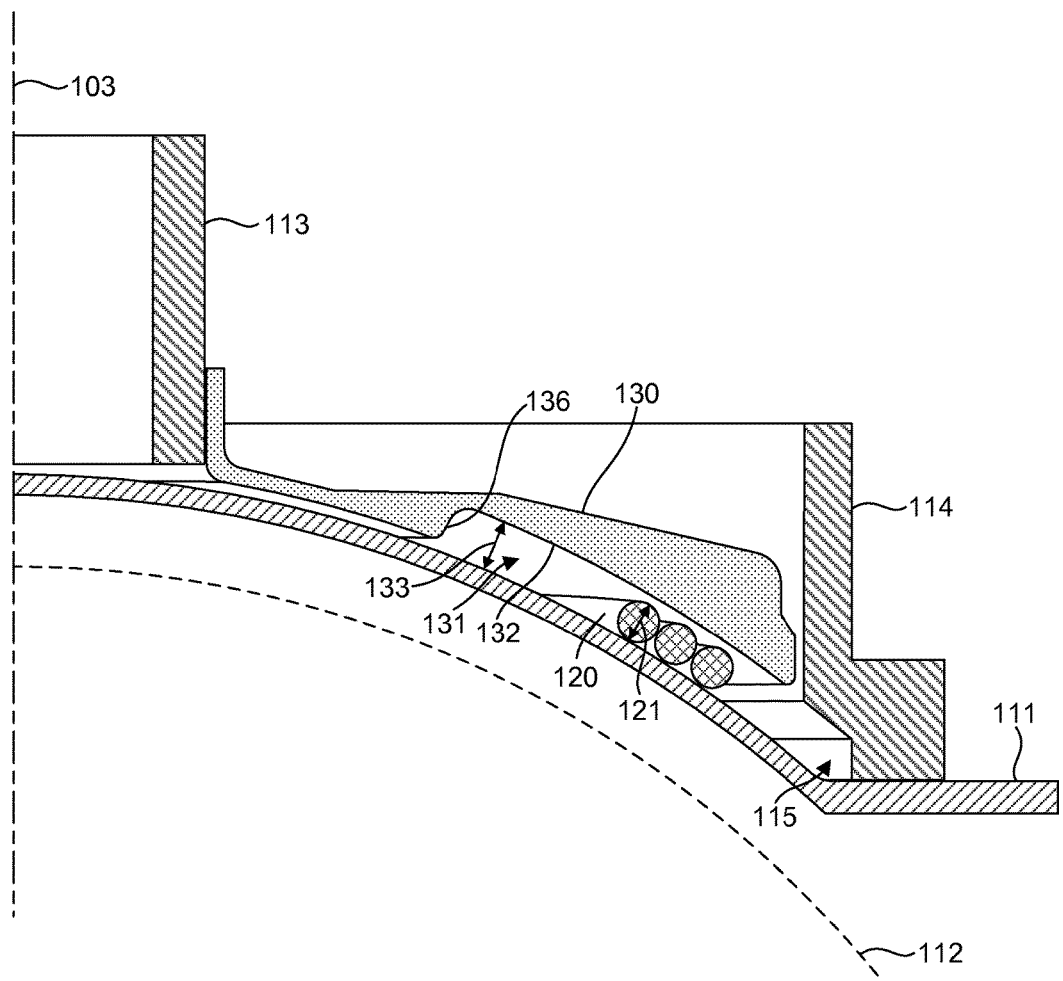
FIG. 3 is a detailed cross-sectional view of the gimbal transmission cable management system of FIG. 1.

In one aspect, the cable retainer 130 can be configured to match the geometry of the underlying gimbal portion. For example, as shown in FIGS. 1 and 3, the gimbal portion 111 comprises a spherical or dome-shaped configuration, which can be useful to accommodate a spherical or ball-shaped gimbal portion 112, such as an elevation turret. As shown in the cross-sectional view of FIG. 3, the cable retainer 130 can therefore be configured to match the spherical or dome shape of the gimbal portion 111 with a boundary surface 132 offset from the gimbal portion 111 by a gap 133 to provide the cable volume 131. The transmission cable 120 therefore rides along the spherical or dome-shaped surface of the gimbal portion 111 as the transmission cable 120 coils and uncoils. It should be recognized that the underlying gimbal portion can be of any shape or configuration, such as a planar or flat configuration. In this case, a cable retainer can match the planar geometry of the underlying gimbal portion by having a planar or flat boundary surface offset by a gap from the underlying gimbal portion to form a cable volume. Such a planar or flat configuration of the underlying gimbal portion and the boundary surface of the cable retainer can represent a simplified cable interface geometry providing less complicated cable movement than that provided by the spherical or dome shaped geometry illustrated in the figures.

In one aspect, the gap 133 or distance in the cable volume 131 between the cable retainer 130 and gimbal portion 111 can be configured to maintain the coil in an orderly spiral or coil configuration (shown in the top view of FIG. 2) with enough space for free and unrestricted movement of the transmission cable 120 as it coils and uncoils, but not so much that the transmission cable 120 can bind on itself between the cable retainer 130 and the gimbal portion 111. In other words, the distance 133 can be configured to prevent a portion of the coiled transmission cable 120 from overlapping or riding over itself within the cable volume 131 as the transmission cable 120 slides along the gimbal portion 111 and/or the boundary surface 132 while coiling and uncoiling. Thus, in a particular aspect, the distance 133 can be less than or equal to 1.5 times a diameter 121 of the transmission cable 120 to maintain the coil in a spiral configuration. In a more particular aspect, the distance 133 can be less than or equal to 1.1 times the diameter 121 of the transmission cable 120 to maintain the coil in a spiral configuration. The cable retainer 130 can be at least partially constructed of any suitable optically transparent material, such as clear Lucite®, to facilitate visual inspection during installation of the transmission cable 120 to ensure that the transmission cable 120 is not binding on itself. The cable retainer 130 can be manufactured by any suitable process or technique, such as stereolithography, molding, casting, etc.

FIG. 3 also illustrates a boundary member 114, which may be fixedly coupled to or integral with the gimbal portion 111. Such a boundary member 114 may be a pre-existing component of the gimbal or it may be added to provide an outer boundary for the cable volume 131. Thus, for example, the boundary member 114 can include an opening 115 that is configured to extend the cable volume 131 formed by the cable retainer 130. Accordingly, the opening 115 can be configured similar to the cable volume 131 between the cable retainer 130 and the gimbal portion 111. If the boundary member 114 is included, then the boundary member 114 can have an opening (hidden from view) through which the transmission cable 120 can extend in order to exit the cable volume 131 and route toward the gimbal axis 104, for example.

In one aspect, the cable retainer 130 can comprise a cable opening 134 proximate the gimbal portion 110 to which the cable retainer 130 is fixed. The cable opening 134 can be configured to facilitate movement of the transmission cable 120 within the opening 134 as the transmission cable 120 coils and uncoils within the cable volume 131. The cable opening 134 can have what can be termed a fan-shaped or fan-blade-shaped configuration that provides edges 135a, 135b with gradual rounded bends for interfacing with the transmission cable 120. The cable opening 134 can be sized to give the transmission cable 120 space to move as it coils and uncoils to ensure that the transmission cable 120 does not cut itself on an edge or corner of the cable opening. The size and/or shape of the cable opening 134 can be determined empirically. The cable retainer 130 can also have an inner surface 136 that defines an inner radius of the cable volume 131 that is greater than or equal to a minimum radius of curvature for the transmission cable 120. The minimum bend radius of the transmission cable 120 can therefore be limited by the inner surface 136 to prevent damage to the cable 120.

In one aspect, shown in FIG. 2, the transmission cable 120 can be fixed or pinned in a static position relative to the gimbal portion 110 and/or the gimbal portion 111 with cable clips or brackets 122, 123, respectively, which can hold the transmission cable 120 without pinching or putting undue stress on the cable. This may be referred to as pinning an "end" of the transmission cable 120 to a gimbal portion. The "end" is actually a point along the cable 120, which may be a continuous fiber, and is only an "end" with respect to the particular gimbal portion that is being described. The true ends of the transmission cable 120 may be coupled to the off-gimbal source and the on-gimbal element or component. Fixing the transmission cable 120 to the gimbal 102 ensures that neither the cable nor its connectors experience undue stress. Such cable clips or brackets can be utilized anywhere in the gimbal 102 to maintain fixed lengths of the transmission cable 120 for each rotating section between gimbal portions of the gimbal 102, which can maintain independent cable sections for each rotating section and prevent movement of the transmission cable from one rotating section to another during use.

In one aspect, the transmission cable 120 can be configured to facilitate a desired range of relative motion between gimbal portions or rotating sections of the gimbal 102, which can exceed ±180 degrees. For example, a length of the transmission cable 120 between the brackets 122, 123 can be sized to facilitate a desired range of motion for the gimbal portions 110, 111 about the axis 103. The length of the transmission cable 120 between the brackets 122, 123 to accommodate a given range of motion will typically be a function of the rotational range of motion and the radial space available for the transmission cable to move, which depends on the cable 120 diameter (which may be driven by optical requirements) as well as the physical packaging restrictions of the gimbal. Such a cable length can be determined empirically with experimental or physical models and may be an iterative process to determine an optimized amount of slack for repeatable cable motion. Generally, it is desirable to provide the transmission cable 120 with as much freedom to move inside the confined space of the cable volume 131 as possible. This includes restricting the length of the transmission cable 120 to prevent an excess of cable that would have no room for free movement within the cable volume 131, which can prevent binding or breakage of the cable 120 and/or the gimbal 102.

The cable retainer 130 disclosed herein can maintain a minimum set radius of curvature of the transmission cable 120, accommodate a wide range of motion, and keep the transmission cable 120 confined to the cable volume 131 where it cannot become entangled with the gimbal 102 or other elements, thereby avoiding damage to the transmission cable 120 and additional loading of the gimbal motors. The present disclosure can therefore provide a power efficient, reliable, compact, lightweight, and inexpensive solution for optically coupling an off-gimbal optical source, such as a laser, to an on-gimbal optical element, such as a ladar unit or a telescope.

The principles disclosed herein can be adapted for gimbal motion in any gimbal axis of rotation, (e.g. roll, nod, and elevation) or any combination thereof. For example, the transmission cable 120 is also shown coiled about the gimbal axis 104, such that bi-directional relative rotation of the gimbal portion 111 and the gimbal portion 112 alternately coils and uncoils a portion of the transmission cable 120 about the gimbal axis 104. It should be recognized that a cable retainer can also be utilized here in a similar manner discussed above.

Figure 4:
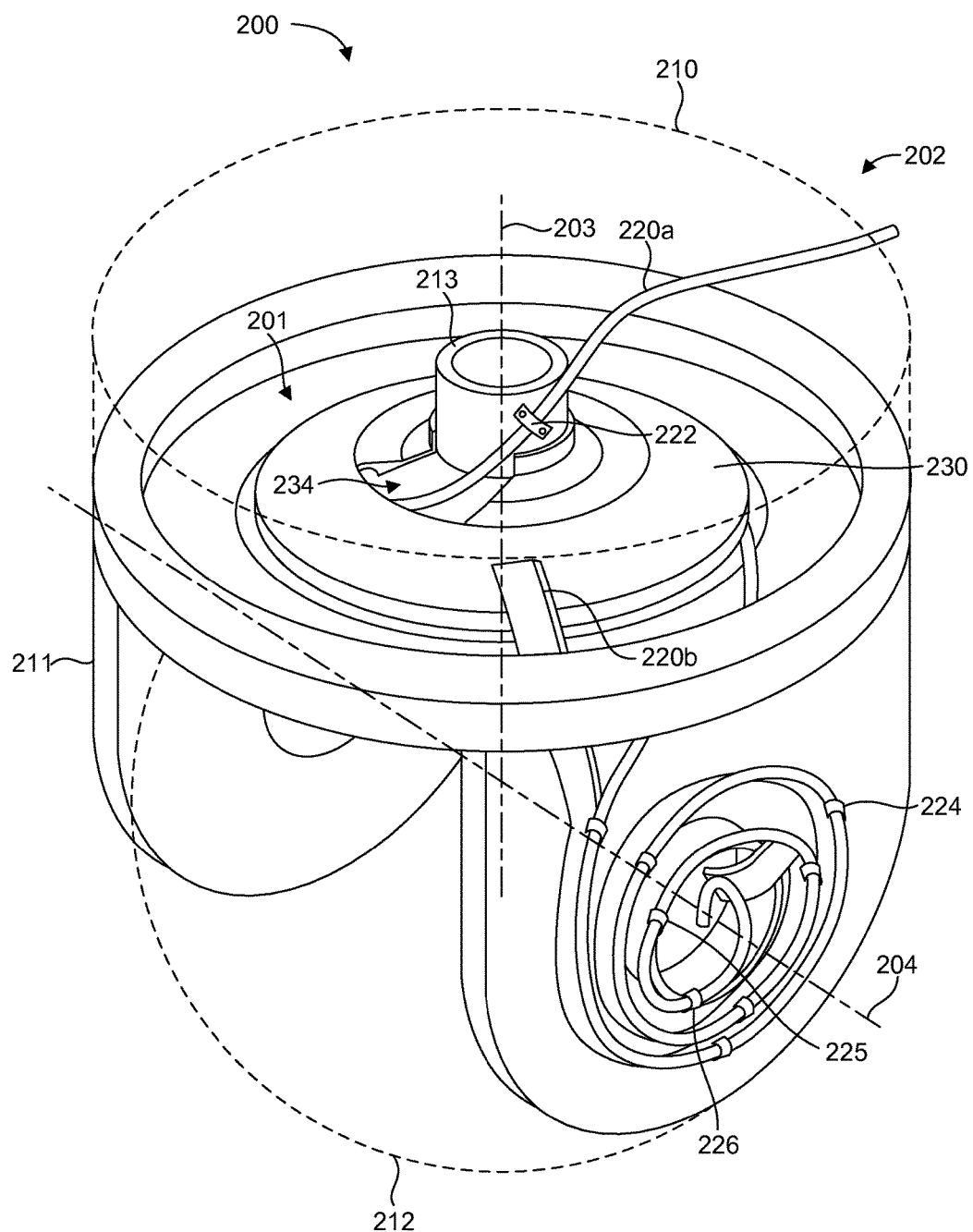
FIG. 4 is perspective view of a gimbal transmission cable management system in accordance with another example of the present disclosure.

FIG. 4 illustrates a gimbal transmission cable management system 200 in accordance with another example of the present disclosure. The system 200 is similar in many respects to the system 100 discussed above. For example, as with the system 100, the system 200 can comprise a transmission cable management device 201, which can include a cable retainer 230, for a gimbal 202. Certain structures and components of the gimbal 202 have been omitted or illustrated in broken lines for clarity in illustrating various aspects of the system 200. The gimbal 202 can include several gimbal portions 210, 211, 212 that are rotatable relative to one another. For example, the gimbal portion 210 and the gimbal portion 211 are rotatable relative to one another to provide rotation about a gimbal axis 203, which may be an azimuth axis in some embodiments. In addition, the gimbal portion 211 and the gimbal portion 212 are rotatable relative to one another to provide rotation about a gimbal axis 204, which may be an elevation axis in some embodiments.

The system 200 can also include transmission cables 220a, 220b, which can each comprise an optical cable, an electrical cable, etc. In one embodiment, the transmission cable 220a can comprise an optical cable and the transmission cable 220b can comprise an electrical cable configured as a ribbon cable. As with the transmission cable 220a, the transmission cable 220b can be coiled about the gimbal axis 203. The transmission cable 220b has been truncated in the figure for clarity, omitting such coiling of the transmission cable 220b above the cable retainer 230. In this case, the cable retainer 230 can maintain separation of the transmission cables 220a, 220b as the gimbal portions 210, 211 rotate relative to one another. In other words, the cable retainer 230 can serve as a divider, forming a separate cable volume as discussed above for the transmission cable 220a, thereby separating the transmission cable 220a from the transmission cable 220b, which can reside above or in a separate volume of space within the gimbal 202. The cable retainer 230 can therefore keep the transmission cables 220a, 220b separated such that the transmission cables 220a, 220b can move (e.g., rotate and/or coil and uncoil) separately and independently from one another to avoid binding, tangling, kinking, etc. of the transmission cables 220a, 220b as the gimbal portions 210, 211 rotate relative to one another about the gimbal axis 203. The transmission cables 220a, 220b can be mingled together in the same gimbal and prevented from tangling or damaging one another. The principles disclosed herein can thus facilitate retrofitting or incorporating a fiber optic cable into a gimbal that includes electrical cables, such as a ribbon cable, in a manner that can prevent damage of the cables and, in particular, can maintain the integrity of the fiber optic cable over a long service life of the gimbal.

In one aspect, the transmission cable 220a can be attached to the gimbal portion 210 (e.g., a resolver cup 213) with a cable clip or bracket 222 to keep the transmission cable 220a from interfering with the dynamically rotating transmission cable 220b above the cable retainer 230. In another aspect, a cable opening 234 of the cable retainer 230 can be included as described above, but can be limited in size to prevent or minimize interference of the transmission cable 220a by the transmission cable 220b, which may fall into the cable opening 234.

The transmission cables 220a, 220b are also shown coiled about the gimbal axis 204, such that bi-directional relative rotation of the gimbal portion 211 and the gimbal portion 212 alternately coils and uncoils portions of the transmission cables 220a, 220b together about the gimbal axis 204. In this case, the transmission cables 220a, 220b can be coupled to one another by one or more cable clips 224, lacing tape, etc. Attaching transmission cables 220a, 220b together can prevent the transmission cable 220a from getting tangled in the transmission cable 220b and also from binding on itself. As the transmission cable 220b makes a bend (here, a 90 degree bend) into a hub of the gimbal portion 211, the transmission cable 220a can be routed independent of the transmission cable 220b. One or both of the transmission cables 220a, 220b can be fixed or pinned as desired to the gimbal portion 211 and/or the gimbal portion 212. For example, the transmission cables 220a, 220b can be fixed or pinned with suitable cable clips or brackets (hidden from view) to the gimbal portion 211 where the transmission cables 220a, 220b exit the rotation structure about the axis 203. This can be done to hold portions of the transmission cables 220a, 220b in a static position and define a length of the transmission cable 220a that will coil and uncoil around the gimbal axis 204. In addition, the transmission cable 220a can be fixed to the gimbal portion 211 by cable clips or brackets 225, 226 to maintain a radius of curvature of the transmission cable 220a that is greater than or equal to a minimum bend radius of the cable 220a. This can facilitate routing the transmission cable 220a through a hub of the gimbal portion 211 while preserving the integrity of the transmission cable 220a. Additional cable clips or brackets can be used as desired to route the transmission cables 220a, 220b to their respective termination points, such as an optical or electrical device or component.

In one aspect, multiple cable retainers can be stacked to accommodate multiple cables, as opposed to allowing an upper cable to move in an unconstrained volume or space.

Thus, the systems disclosed herein can effectively manage one or more cables (conventional and/or fiber optic) while minimizing the friction or drag associated with motion about a gimbal axis and preventing cable damage and the resultant loss of performance.

In accordance with one embodiment of the present invention, a method for facilitating cable management in a gimbal is disclosed. The method can comprise providing a cable retainer to be fixed relative to one of a first gimbal portion and a second gimbal portion, the first and second gimbal portions being rotatable relative to one another about a gimbal axis. Additionally, the method can comprise facilitating formation of a cable volume between the cable retainer and at least one of the first and second gimbal portions, the cable volume being configured to receive a transmission cable therein coiled about the gimbal axis, wherein bi-directional relative rotation of the first and second gimbal portions alternately coils and uncoils a portion of the transmission cable about the gimbal axis within the cable volume. In one aspect, a distance, in the cable volume, between the cable retainer and at least one of the first and second gimbal portions is configured to maintain the coil in a spiral configuration. It is noted that no specific order is required in this method, though generally in one embodiment, these method steps can be carried out sequentially.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A gimbal transmission cable management system, comprising:
   a first gimbal portion and a second gimbal portion rotatable relative to one another to provide rotation about a gimbal axis;
   a cable retainer fixed relative to one of the first and second gimbal portions and defining a cable volume between the cable retainer and at least one of the first and second gimbal portions;
   a cable opening in the cable retainer proximate the one of the first and second gimbal portions to which the cable retainer is fixed, the cable opening being at least partially defined by a first edge and a second edge of the cable retainer; and
   a transmission cable coiled about the gimbal axis within the cable volume,
   wherein bi-directional relative rotation of the first and second gimbal portions alternately coils and uncoils a portion of the transmission cable about the gimbal axis within the cable volume, and
   wherein the first edge and the second edge of the cable retainer are configured to interface with the transmission cable and facilitate movement of the transmission cable within the cable opening alternately between the first and second edges as the transmission cable coils and uncoils within the cable volume.

2. The gimbal transmission cable management system of claim 1, wherein the transmission cable is fixed to at least one of the first and second gimbal portions.

3. The gimbal transmission cable management system of claim 1, further comprising a third gimbal portion rotatable relative to the second gimbal portion to provide rotation about a second gimbal axis, wherein the transmission cable is coiled about the second gimbal axis such that bi-directional relative rotation of the second and third gimbal portions alternately coils and uncoils a portion of the transmission cable about the second gimbal axis.

4. The gimbal transmission cable management system of claim 1, wherein a distance, in the cable volume, between the cable retainer and at least one of the first and second gimbal portions is configured to maintain the coil in a spiral configuration.

5. The gimbal transmission cable management system of claim 4, wherein the distance, in the cable volume, between the cable retainer and at least one of the first and second gimbal portions is less than or equal to 1.5 times a diameter of the transmission cable to maintain the coil in a spiral configuration.

6. The gimbal transmission cable management system of claim 5, wherein the distance, in the cable volume, between the cable retainer and at least one of the first and second gimbal portions is less than or equal to 1.1 times a diameter of the transmission cable to maintain the coil in a spiral configuration.

7. The gimbal transmission cable management system of claim 1, wherein the cable retainer defines an inner radius of the cable volume that is greater than or equal to a minimum radius of curvature for the transmission cable.

8. The gimbal transmission cable management system of claim 1, wherein the cable retainer is at least partially constructed of an optically transparent material to facilitate installation of the transmission cable.

9. The gimbal transmission cable management system of claim 1, wherein the cable retainer is at least partially constructed of friction reducing material to facilitate movement of the transmission cable within the cable volume.

10. The gimbal transmission cable management system of claim 1, wherein the transmission cable comprises an optical cable, an electrical cable, or a combination thereof.

11. A transmission cable management device for a gimbal, comprising:
    a cable retainer to be fixed relative to one of a first gimbal portion and a second gimbal portion, the first and second gimbal portions being rotatable relative to one another about a gimbal axis, the cable retainer being configured to define a cable volume between the cable retainer and at least one of the first and second gimbal portions, the cable volume being configured to receive a transmission cable therein coiled about the gimbal axis; and
    a cable opening in the cable retainer proximate the one of the first and second gimbal portions to which the cable retainer is to be fixed, the cable opening being at least partially defined by a first edge and a second edge of the cable retainer,
    wherein bi-directional relative rotation of the first and second gimbal portions alternately coils and uncoils a portion of the transmission cable about the gimbal axis within the cable volume, and
    wherein the first edge and the second edge of the cable retainer are configured to interface with the transmission cable and facilitate movement of the transmission cable within the cable opening alternately between the first and second edges as the transmission cable coils and uncoils within the cable volume.

12. The transmission cable management device of claim 11, wherein a distance, in the cable volume, between the cable retainer and at least one of the first and second gimbal portions is configured to maintain the coil in a spiral configuration.

13. The transmission cable management device of claim 12, wherein the distance, in the cable volume, between the cable retainer and at least one of the first and second gimbal portions is less than or equal to 1.5 times a diameter of the transmission cable to maintain the coil in a spiral configuration.

14. The transmission cable management device of claim 13, wherein the distance, in the cable volume, between the cable retainer and at least one of the first and second gimbal portions is less than or equal to 1.1 times a diameter of the transmission cable to maintain the coil in a spiral configuration.

15. The transmission cable management device of claim 11, wherein the cable retainer defines an inner radius of the cable volume that is greater than or equal to a minimum radius of curvature for the transmission cable.

16. The transmission cable management device of claim 11, wherein the cable retainer comprises a cable opening proximate the one of the first and second gimbal portions to which the cable retainer is to be fixed, wherein the cable opening is configured to facilitate movement of the transmission cable within the opening as the transmission cable coils and uncoils within the cable volume.

17. The transmission cable management device of claim 11, wherein the cable retainer is at least partially constructed of an optically transparent material to facilitate installation of the transmission cable.

18. The transmission cable management device of claim 11, the cable retainer is at least partially constructed of friction reducing material to facilitate movement of the transmission cable within the cable volume.

19. A method for facilitating cable management in a gimbal, comprising:
   providing a cable retainer to be fixed relative to one of a first gimbal portion and a second gimbal portion, the first and second gimbal portions being rotatable relative to one another about a gimbal axis, a cable opening in the cable retainer being proximate the one of the first and second gimbal portions to which the cable retainer is to be fixed, the cable opening being at least partially defined by a first edge and a second edge of the cable retainer; and
   facilitating formation of a cable volume between the cable retainer and at least one of the first and second gimbal portions, the cable volume being configured to receive a transmission cable therein coiled about the gimbal axis, wherein bi-directional relative rotation of the first and second gimbal portions alternately coils and uncoils a portion of the transmission cable about the gimbal axis within the cable volume, and wherein the first edge and the second edge of the cable retainer are configured to interface with the transmission cable and facilitate movement of the transmission cable within the cable opening alternately between the first and second edges as the transmission cable coils and uncoils within the cable volume.

20. The method of claim 19, wherein a distance, in the cable volume, between the cable retainer and at least one of the first and second gimbal portions is configured to maintain the coil in a spiral configuration.

* * * * *